No. 894,175. PATENTED JULY 28, 1908.
A. O. ANDERSON & A. JOHNSON.
SEPARABLE TOOTH FOR POWER SHOVEL DIPPERS.
APPLICATION FILED FEB. 24, 1908.
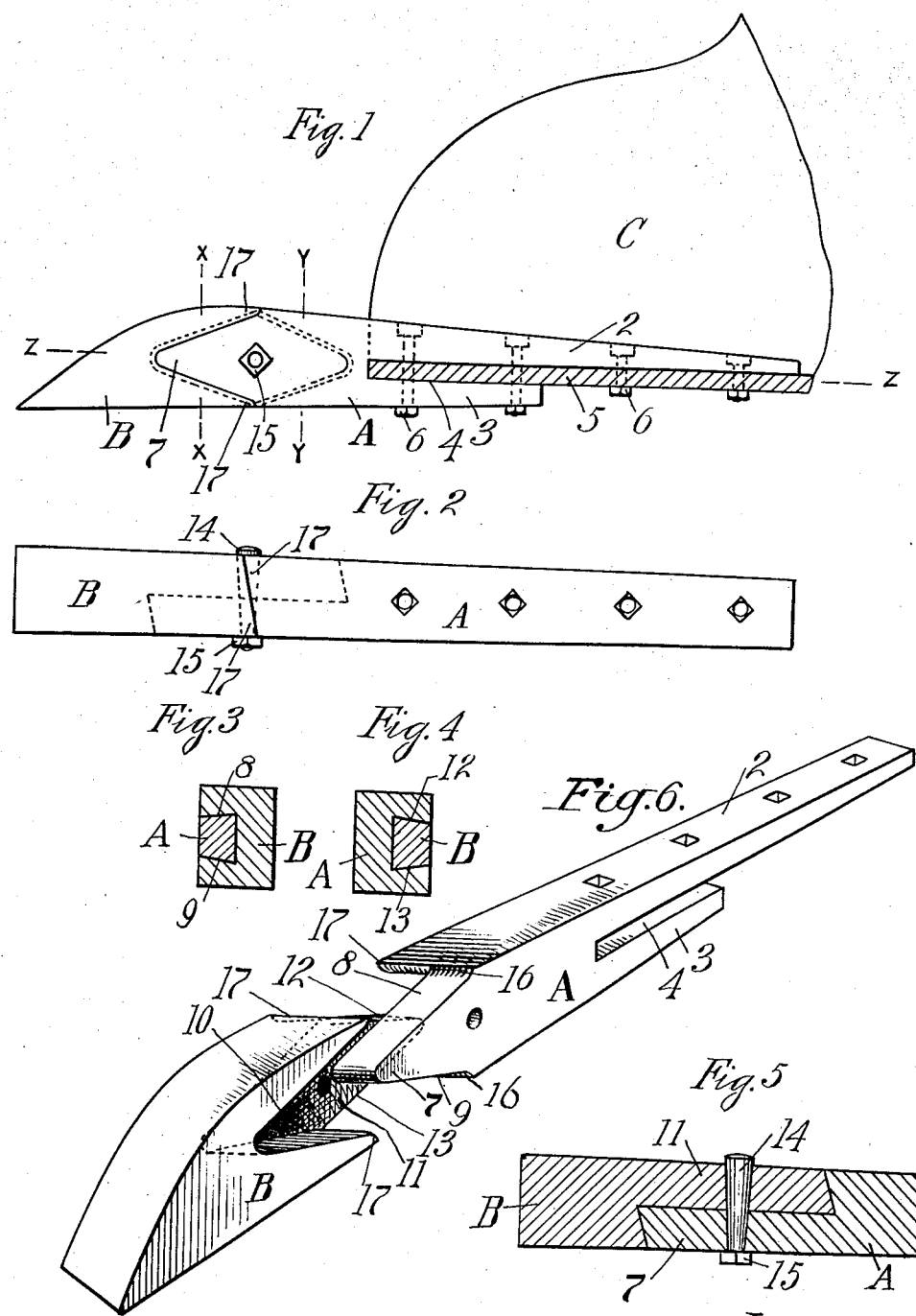
Witnesses,
George Voelker
Hattie Smith
Inventors,
Andrew O. Anderson
Andrew Johnson
by Lothrop & Johnson
their Attorneys.

UNITED STATES PATENT OFFICE.

ANDREW O. ANDERSON AND ANDREW JOHNSON, OF ST. PAUL, MINNESOTA, ASSIGNORS OF ONE-HALF TO RUDOLPH MATAK AND WILLIAM MATAK, OF ST. PAUL, MINNESOTA.

SEPARABLE TOOTH FOR POWER-SHOVEL DIPPERS.

No. 894,175.      Specification of Letters Patent.      Patented July 28, 1908.

Application filed February 24, 1908. Serial No. 417,324.

*To all whom it may concern:*

Be it known that we, ANDREW O. ANDERSON and ANDREW JOHNSON, citizens of the United States, residing at St. Paul, in the county of Ramsey and State of Minnesota, have invented certain new and useful Improvements in Separable Teeth for Power-Shovel Dippers, of which the following is a specification.

Our invention relates to improvements in separable tooth for power shovel dippers, and has for its object to provide a tooth having a removable point fitted and secured to the shank portion of the tooth in such way as to resist lateral and other strains and not be loosened or broken off thereby.

To that end the invention consists in the construction, combination and arrangement of parts hereinafter described and claimed.

In the accompanying drawings forming part of this specification Figure 1 is a side view of a dipper tooth embodying our improved construction, a fragment of the dipper being shown partly in section and partly in elevation; Fig. 2 is a top view of the tooth alone; Fig. 3 is a cross section on line $x-x$ of Fig. 1; Fig. 4 is a cross section on line $y-y$ of Fig. 1; Fig. 5 is a horizontal section through a fragment of the tooth on line $z-z$ of Fig. 1, and Fig. 6 is a perspective view of the two members of the dipper tooth slightly separated from each other.

As shown in the drawings the dipper tooth comprises a shank member A and a point member B. The shank member is formed with a comparatively long upper shank 2 and a shorter lower shank 3, between which is a slot 4 to receive and embrace the bottom or cutting edge 5 of a power shovel dipper C. The tooth is secured to the dipper by means of bolts 6 passing through the shanks and the bottom of the dipper, as shown in Fig. 1.

The forward end of the shank member projects beyond the cutting edge of the dipper, and is formed on one side with a forwardly projecting nose 7, which has forwardly convergent upper and lower faces 8 and 9, and fits snugly within a similarly shaped socket 10 in the corresponding side of the point member B. Likewise the point member is formed on its other side with a rearwardly projecting nose 11 having convergent upper and lower faces 12 and 13 adapted to fit within a similarly shaped socket in the corresponding side of the shank portion of the tooth. The socket extends rearwardly into the shank portion, but terminates short of the slot 4. Thus the meeting ends of the shank and point members will dovetail into each other, and the overlapping portions thereof will provide lateral as well as top and bottom support for each other. They are fastened together by means of one or more pins or bolts 14 passing laterally through the overlapping nose portions, and preferably tapered, as shown in Fig. 5, so as to draw and bind the members tightly together from front to rear. They are held together laterally by means of a nut 15 upon the end of the pin.

At the base of the nose each member is preferably formed with top and bottom shoulders 16 which serve as abutments for the blunt outer ends 17 of the coöperating socket in the other member.

Further to strengthen the joint and to brace the overlapping portions of the tooth members upon each other against lateral strains and knocks, the top and bottom faces of each nose are beveled or cut away toward the outside so that the nose is reduced in height or thickness towards its outer side, and the ends of the noses are similarly beveled or cut away toward the outside, the upper and lower faces and the ends of the socket walls being oppositely or inwardly beveled so that the noses will be dovetailed or rabbeted into the sockets and the beveled faces will receive and take up part of the lateral thrust. With the same object in view, namely to brace the members laterally against each other, the shoulders 16 are also beveled or cut away toward the outside, and the outer ends 17 of the top and bottom walls of the sockets are oppositely beveled in order to form a close joint with the shoulders.

It will be seen that the construction described is particularly adapted to strengthen and brace the joint between the meeting members of the tooth against lateral strains and knocks, and that when the point is once drawn tightly against the shank portion of the tooth members, being thus dovetailed together, cannot work upon one another, whereby the bolts are practically relieved from strain.

We claim as our invention:

1. A separable tooth comprising a shank member and a point member, the shank member having on one side a forwardly projecting nose and on the other side a rearwardly extending socket, and the point member having on one side a rearwardly projecting nose adapted to fit snugly within the socket in the shank member and on the other side a forwardly extending socket adapted to receive snugly the nose of the shank member.

2. A dipper tooth of the class described comprising two separable members, a shank member adapted to be secured to a power shovel dipper and a point member, the shank member being formed on one side with a forwardly projecting nose, and the point member being formed on the corresponding side with a socket adapted to receive said nose, said point member being also formed on its other side with a rearwardly projecting nose, and the shank member being formed on the corresponding side with a socket shaped to receive the nose of the point member, the upper and lower faces of the noses being cut away toward the outside, and the upper and lower faces of the sockets being cut away toward the inside, whereby the noses are dovetailed into the sockets.

3. A dipper tooth for power shovels comprising two separable members, a shank member adapted to be secured to a power shovel dipper and a point member, the point member and shank member being formed at their opposing ends with overlapping noses formed on opposite sides of their longitudinal axes, each member being also formed on the other side of its longitudinal axis with a socket adapted to receive snugly the nose of the other member, the outer end of each nose being cut away toward the outside, and the inner ends of each socket being oppositely cut away, and fastening means passing laterally through the overlapping end portions.

4. A dipper tooth comprising two separable members, a shank member adapted to be secured to a dipper and a removable point member, said members being provided with overlapping noses arranged on opposite sides of the longitudinal axis of the tooth, and being also formed with sockets adapted to receive said noses, and a pin passing removably through said overlapping portions.

5. The combination, with a power shovel dipper, of a separable tooth therefor comprising a shank member adapted to be secured to the dipper and a removable point member, the point member and tooth member being formed on opposite sides of the longitudinal axis of the tooth with a projecting nose, and each of said members being formed on the other side with a socket to receive the nose of the opposing member, each member being formed at the base of the nose with top and bottom shoulders cut away toward the outside, and the outer ends of the sockets being cut away toward the inside to fit against the shoulders, and means passing laterally through the overlapping ends of the members for securing the same together.

In testimony whereof we affix our signatures in presence of two witnesses.

ANDREW O. ANDERSON.
ANDREW JOHNSON.

Witnesses:
ARTHUR P. LOTHROP,
HATTIE SMITH.